United States Patent
Park et al.

(10) Patent No.: US 8,072,940 B2
(45) Date of Patent: Dec. 6, 2011

(54) CONTROLLING METHOD AND DATA CALL HANDOVER METHOD FOR DUAL BAND/DUAL MODE MOBILE COMMUNICATION TERMINAL

(75) Inventors: Seong-Soo Park, Seoul (KR); Dong-Hahk Lee, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 1097 days.

(21) Appl. No.: 11/576,832

(22) PCT Filed: Jan. 5, 2005

(86) PCT No.: PCT/KR2005/000020
§ 371 (c)(1),
(2), (4) Date: Oct. 4, 2007

(87) PCT Pub. No.: WO2006/073211
PCT Pub. Date: Jul. 13, 2006

(65) Prior Publication Data
US 2008/0117874 A1    May 22, 2008

(51) Int. Cl.
*H04W 4/00* (2009.01)
*H04W 36/00* (2009.01)

(52) U.S. Cl. ..... 370/332; 370/331; 370/328; 455/432.1; 455/436; 455/437; 455/435.1

(58) Field of Classification Search ............... 455/432.1, 455/432.3, 435.1, 435.2, 435.3, 436, 437; 370/328, 331, 332
See application file for complete search history.

(56) References Cited

U.S. PATENT DOCUMENTS

| | | | |
|---|---|---|---|
| 7,236,781 B2* | 6/2007 | Patil et al. | 455/432.1 |
| 2005/0128980 A1* | 6/2005 | Han et al. | 370/331 |

FOREIGN PATENT DOCUMENTS

| | | |
|---|---|---|
| JP | 2001-186552 | 8/2001 |
| JP | 2001-224052 | 8/2001 |
| JP | 2003-102059 | 4/2003 |
| JP | 2004-328135 | 11/2004 |
| JP | 2004-363700 | 12/2004 |
| KR | 10-2001-0056283 | 7/2001 |
| KR | 10-2002-0043838 | 6/2002 |
| WO | 2004/068797 | 8/2004 |
| WO | 2004/091244 | 10/2004 |

* cited by examiner

*Primary Examiner* — Un C Cho
(74) *Attorney, Agent, or Firm* — Lowe Hauptman Ham & Berner LLP

(57) ABSTRACT

In the data call handover method, the mobile communication terminal registers a Mobile Internet Protocol (MIP address) through an asynchronous mobile communication network and receives data call service when a data call connection event is initiated by the mobile communication terminal. It is determined whether the mobile communication terminal has entered an area in which the asynchronous mobile communication network and a synchronous mobile communication network overlap. If the mobile communication terminal has entered the overlap area, it is determined whether to perform handover to the synchronous mobile communication network based on the intensity of a signal of the asynchronous mobile communication network. If handover is to be performed, a data call between the mobile communication terminal and the synchronous mobile communication network is established and the MIP address is registered. The service of the data call, which is provided by the asynchronous mobile communication network, is linked with the service of the synchronous mobile communication network. The data call between the mobile communication terminal and the asynchronous mobile communication network is released.

10 Claims, 10 Drawing Sheets

CONTROLLING METHOD AND DATA CALL HANDOVER METHOD FOR DUAL BAND/DUAL MODE MOBILE COMMUNICATION TERMINAL

CROSS REFERENCE TO RELATED APPLICATION

This application is the National Phase application of International Application No. PCT/KR2005/000020, filed Jan. 5, 2005, which designates the United States and was published in English. This application, in its entirety, is incorporated herein by reference.

TECHNICAL FIELD

The present invention relates to a control method and a data call handover method for a mobile communication terminal that supports a dual band/dual mode, which enables the uninterrupted handover of a data call in a synchronous mobile communication network and an asynchronous mobile communication network.

BACKGROUND ART

With the development of mobile communication technology and the evolution of communication networks, a variety of mobile communication systems have been developed. In order to solve the problem of global roaming between the mobile communication systems, the International Mobile Telecommunication (IMT)-2000 systems have been developed. The IMT-2000 systems are classified into a Code Division Multiple Access (CDMA) 2000-based synchronous system and a Wideband Code Division Multiple Access (WCDMA)-based asynchronous system.

Furthermore, in order to support global roaming between the mobile communication systems, a mobile communication terminal capable of being used in both a synchronous type system and an asynchronous type system, that is, a Dual Band Dual Mode (DBDM) mobile communication terminal, has been developed. Using the mobile communication terminal, different types of services can be respectively used in an asynchronous system area and a synchronous system area.

Currently, the asynchronous mobile communication network is being constructed in regions having high demand for service and, therefore, the synchronous mobile communication network is evolving such that the service area thereof includes the service areas of an asynchronous system. In such a process, handover between the systems is necessary so as to provide continuous service in the case where a user moves between an asynchronous mobile communication system and a synchronous mobile communication system.

In this environment, roaming between a synchronous type system and an asynchronous type system becomes the most critical issue. Conventionally, a problem occurs in that a data interruption time of more than 10 seconds occurs and, therefore, it is difficult to provide normal data service, in consideration of modem initialization, initial call establishment, data call establishment, and MIP address registration time, when a mobile communication terminal receiving service in an asynchronous mobile communication network performs handover to a synchronous mobile communication network, such as a CDMA2000 1x/Ev-Do network, at the time of performing a data call.

SUMMARY OF THE INVENTION

Accordingly, the present invention has been made keeping in mind the above problems occurring in the prior art, and an object of the present invention is to provide a control method and a data call handover method for a mobile communication terminal supporting a DBDM, which prevents the loss of data by controlling the mobile communication terminal supporting a DBDM at the time of handover of the mobile communication terminal that receives a data call service, thus enabling uninterrupted handover without disconnection of the data call.

DETAILED DESCRIPTION OF THE INVENTION

In order to accomplish the above object, the present invention provides a control method for a mobile communication terminal supporting a DBDM mode, the method including the first step of activating wireless transmission and reception units of an asynchronous wireless device when a data call connection command is inputted; the second step of determining whether the mobile communication terminal is located in a service area of an asynchronous mobile communication network through the wireless transmission and reception units of the activated asynchronous wireless device; the third step of activating the asynchronous modem of the asynchronous wireless device if the mobile communication terminal is located in the service area of the asynchronous mobile communication network at the second step; the fourth step of acquiring a Mobile Internet Protocol (MIP address) address in the asynchronous mobile communication network through the asynchronous wireless device and performing data service; and the fifth step of performing handover to a synchronous mobile communication network based on the intensity of the signal of the asynchronous mobile communication network while the fourth step is performed.

In addition, the present invention provides a data call handover method from an asynchronous area to a synchronous area, the method including the first step of the mobile communication terminal registering an MIP address through an asynchronous mobile communication network and receiving data call service when a data call connection event is initiated by the mobile communication terminal; the second step of determining whether the mobile communication terminal has entered an area in which the asynchronous mobile communication network and the synchronous mobile communication network overlap while the first step is performed; the third step of determining whether to perform handover to a synchronous mobile communication network based on the intensity of the signal of the asynchronous mobile communication network if it is determined that the mobile communication terminal has entered the overlap area at the second step; the fourth step of establishing a data call between the mobile communication terminal and the synchronous mobile communication network and registering the MIP address if it is determined that handover is to be performed at the third step; the fifth step of linking the service of the data call, which is provided by the asynchronous mobile communication network, with the service of the synchronous mobile communication network after the MIP address in the synchronous mobile communication network is registered at the fourth step; and the sixth step of releasing the data call between the mobile communication terminal and the asynchronous mobile communication network after the fifth step.

In addition, the present invention provides a data call handover method from a synchronous area to an asynchronous area, the method including the first step of the mobile communication terminal registering an MIP address through a synchronous mobile communication network and receiving data call service when a data call connection event is initiated by the mobile communication terminal; the second step of determining whether the mobile communication terminal has entered an area in which an asynchronous mobile communication network and the synchronous mobile communication network overlap while the first step is performed; the third step of determining whether to perform handover to the asynchronous mobile communication network based on the intensity of the signal of the synchronous mobile communication network if it is determined that the mobile communication terminal has entered the overlap area at the second step; the fourth step of establishing a data call between the mobile communication terminal and the asynchronous mobile communication network and registering the MIP address if it is determined that handover is to be performed at the third step; the fifth step of linking the service of the data call, which is provided by the synchronous mobile communication network, with the service of the asynchronous mobile communication network after the MIP address in the asynchronous mobile communication network is registered at the fourth step; and the sixth step of releasing the data call between the mobile communication terminal and the synchronous mobile communication network after the fifth step.

The present invention is described in detail with reference to the accompanying drawings below.

Figure 1:
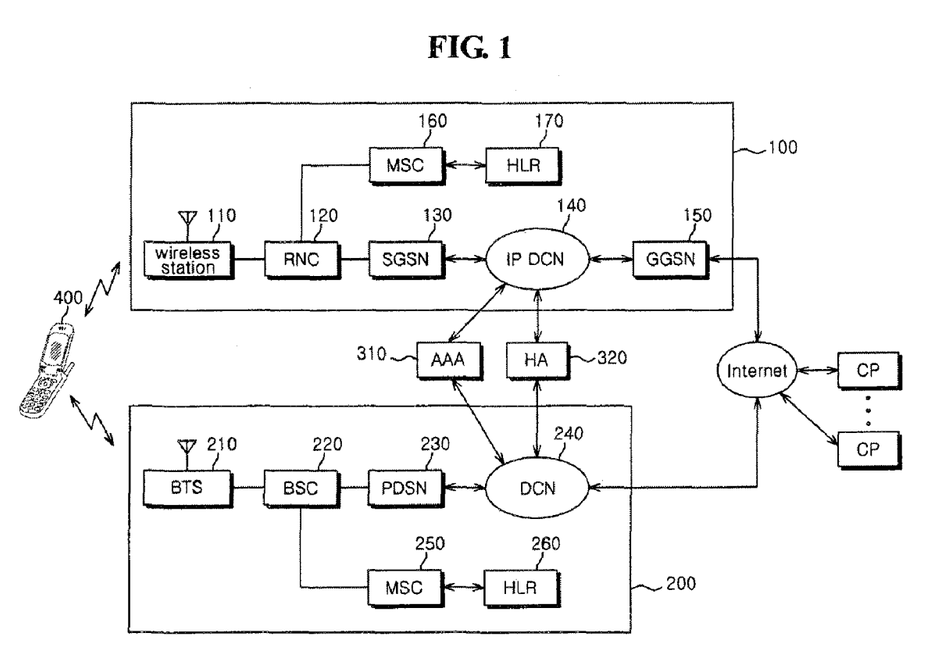
FIG. 1 is a block diagram illustrating connections between a mobile communication terminal that is applied to the present invention and mobile communication networks.

FIG. 1 is a block diagram illustrating connections between a mobile communication terminal that is applied to the present invention and mobile communication networks.

Referring to FIG. 1, the asynchronous mobile communication network 100, such as a WCDMA network, includes a wireless station 110 for wireless communication with a mobile communication terminal 400, a Radio Network Controller (hereinafter referred to as an "RNC") 120 for controlling the wireless station 110, a Serving GPRS Service Node (hereinafter referred to as an "SGSN") 130 connected to the RNC 120 and configured to manage the mobility of the mobile communication terminal 400, and an asynchronous communication network data service gateway node Hereafter referred to as a "Gateway GPRS Supporting Node (GGSN)" 150, which is a relay device for performing packet service control and packet data transmission through an Internet Protocol Data Core Network (hereinafter referred to as an "IPDCN") 140.

Furthermore, a Mobile Switching Center (hereinafter, referred to as an "MSC") 160 for performing call exchange 104 is connected to the RNC 120, and the MSC 160 is connected to a Home Location Register hereinafter referred to as an "HLR") 170 for managing information about subscribers' locations.

Meanwhile, a synchronous mobile communication network (CDMA 2000 network) 200, includes a base station (hereinafter referred to as a "Base Transceiver System (BTS)") 210 for wirelessly communicating with the mobile communication terminal 400, a Base Station Controller (hereinafter referred to as a "BSC") 220 for controlling the BTS 210, a Packet Data Service Node (hereinafter referred to as a "PDSN") 230 connected to the BSC 220 to provide packet data service, a Data Core Network (hereinafter referred to as a "DCN") 240 connected to the PDSN 230 to provide Internet connection service, and a Mobile Switching Center (hereinafter referred to as an "MSC") 250 connected to the BSC 220 to perform call switching. Furthermore, the MSC 250 is connected to an HLR 260 for managing information about subscribers' locations And the IPDCN 140 and DCN 240 are connected to authentication server hereinafter referred to as a "AAA") 310 and home agent (hereinafter referred to as a "HA") 320.

Although, in the present embodiment, the synchronous and asynchronous mobile communication network 200 and 100 include the HLRs 170 and 260 for managing information about subscribers and the subscribers' locations respectively, the synchronous and asynchronous mobile communication networks 200 and 100 may share the information about subscribers and the subscribers' locations with each other using a single HLR (a dual stack HLR).

Figure 2:
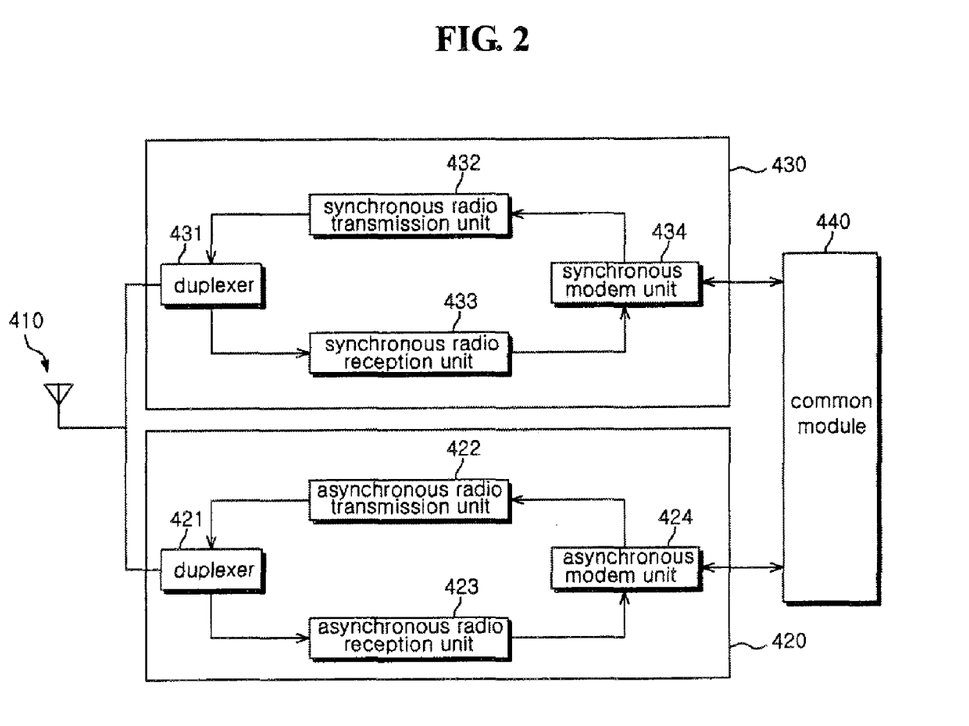
FIG. 2 is a block diagram illustrating the construction of the mobile communication terminal that is applied to the present invention.

FIG. 2 is a block diagram illustrating the construction of the DBDM mobile communication terminal according to the present invention.

Referring to FIG. 2, the DBDM mobile communication terminal 400 according to the present invention supports both synchronous mobile communication and asynchronous mobile communication, and has respective stacks for corresponding protocols.

The mobile communication terminal 400 according to the present invention includes an antenna 410 for transmitting and receiving radio waves to and from the synchronous mobile communication network 200 and the asynchronous mobile communication network 100, a synchronous wireless device 430 for performing synchronous communication, an asynchronous wireless device 420 for performing asynchronous communication, and a common module 440 for providing common resources when synchronous and asynchronous communication are performed.

The synchronous wireless device 430 includes a synchronous wireless transmission unit 432 for performing wireless transmission, a synchronous wireless reception unit 433 for performing wireless reception, and a synchronous modem unit 434. One side of each of the synchronous wireless transmission unit 432 and the synchronous wireless reception unit 433 is connected to the antenna 410 via a duplexer 431, and the other side of each of the synchronous wireless transmission unit 432 and the synchronous wireless reception unit 433 is connected to the synchronous modem unit 434.

Furthermore, the asynchronous wireless device 420 includes an asynchronous wireless transmission unit 422 for performing wireless transmission, an asynchronous wireless reception unit 423 for performing wireless reception, and an asynchronous modem unit 424. One side of each of the asynchronous wireless transmission unit 422 and the asynchronous wireless reception unit 423 is connected to the antenna 410 via a duplexer 421, and the other side of each of the asynchronous wireless transmission unit 422 and the asynchronous wireless reception unit 423 is connected to the asynchronous modem unit 424.

The mobile communication terminal 400 according to the present invention can activate either the asynchronous wireless device 420 or the synchronous wireless device 430, or both the asynchronous wireless device 420 and the synchronous wireless device 430, and control the activation of each wireless device so as to minimize power consumption attributable to handover.

The mobile communication terminal 400 applied to the present invention may move from a synchronous area into an asynchronous area, move into a neighboring asynchronous cell in the asynchronous area, or move from an asynchronous area into the synchronous area while performing a data call. The present invention provides a method of controlling a mobile communication terminal and a handover method corresponding to each case.

Figure 3:
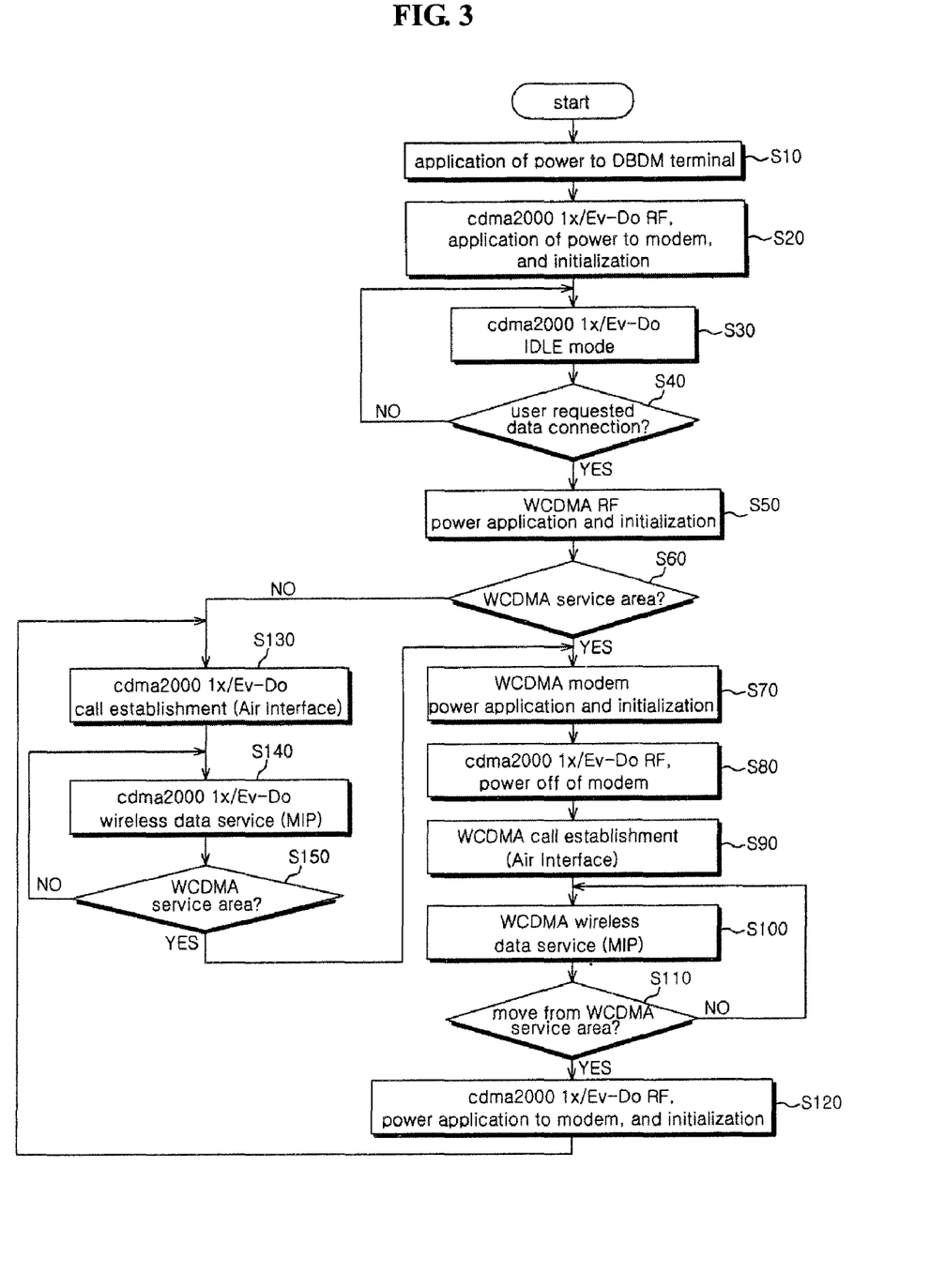
FIG. 3 is a flowchart illustrating a method of controlling a DBDM mobile communication terminal according to an embodiment of the present invention.

FIG. 3 is a flowchart illustrating a method of controlling a DBDM mobile communication terminal according to an embodiment of the present invention, and shows a control method in the case where a mobile communication terminal moves from the synchronous area to the asynchronous area and moves from the asynchronous area to the synchronous area.

Referring to FIG. 3, when power is applied to the mobile communication terminal 400 at step S10, the mobile communication terminal 400 applies power to the synchronous wireless device 430 and performs initialization at step S20. Accordingly, the synchronous modem unit 434 is activated, performs location registration with the synchronous mobile communication network 200 through a typical location registration procedure, and enters into an idle mode at step S30.

Thereafter, if a data call, for example a wireless Internet connection request, is made by a user at step S40, the mobile communication terminal 400 applies power to the asynchronous wireless transmission unit 422 and the asynchronous wireless reception unit 423, which takes charge of the Radio Frequency (RF) of the asynchronous wireless device 420, and performs initialization so as to make a data call connection at step S50.

After step S50, the mobile communication terminal 400 determines whether the current location thereof is contained in the service area of the asynchronous mobile communication network based on the intensity of the signal of the asynchronous mobile communication network 100 received through the asynchronous wireless device 420 at step S60.

If it is determined that the location of the mobile communication terminal 400 is contained in the service area of the asynchronous mobile communication network 100 at step S60, power is applied to the asynchronous modem unit 424 of the asynchronous wireless device 420 and initialization is performed at step S70.

Thereafter, the synchronous wireless device 430 is deactivated at step S80, and a WCDMA call (air interface) with the asynchronous mobile communication network 100 is established through the asynchronous wireless device 420 at step S90.

Accordingly, the mobile communication terminal 400 is assigned a Mobile Internet Protocol (MIP address) address by a Home Agent (HA) 320 through the asynchronous mobile communication network 100 and receives data service at step S100.

The mobile communication terminal 400 determines whether the mobile communication terminal 400 moves from the service area of the asynchronous mobile communication network 100 by continuously measuring signals from the asynchronous mobile communication network 100 in the process of receiving the data service through the asynchronous mobile communication network 100 at step S110.

If it is determined that the mobile communication terminal 400 has moved from the area of the asynchronous mobile communication network 100 based on a predetermined criterion at step S110, the synchronous wireless device 430, which is currently deactivated, is activated at step S120. Thereafter, a CDMA2000 data call with the synchronous mobile communication network 200 is established through the synchronous wireless device 430 at S130.

Accordingly, the mobile communication terminal 400 is assigned an MIP address by the HA 320 through the synchronous mobile communication network 200 and receives data service at step S140.

The mobile communication terminal 400 determines whether the mobile communication terminal 400 has entered the service area of the asynchronous mobile communication network 100 by continuously measuring signals from the asynchronous mobile communication network 100 in the process of receiving the data service through the synchronous mobile communication network 200 at step S150.

If it is determined that the mobile communication terminal 400 has entered the area of the asynchronous mobile communication network 100 at step S150, step S70, described above, is performed.

In the present embodiment, the mobile communication terminal always or periodically turns on the asynchronous wireless device 420 and must measure the intensity of a signal received from the asynchronous mobile communication system so as to prepare for the case where a mobile communication terminal that has moved from the synchronous area into the asynchronous area moves into the synchronous area again, and the case where a mobile communication terminal moves into the asynchronous area again.

Figure 4:
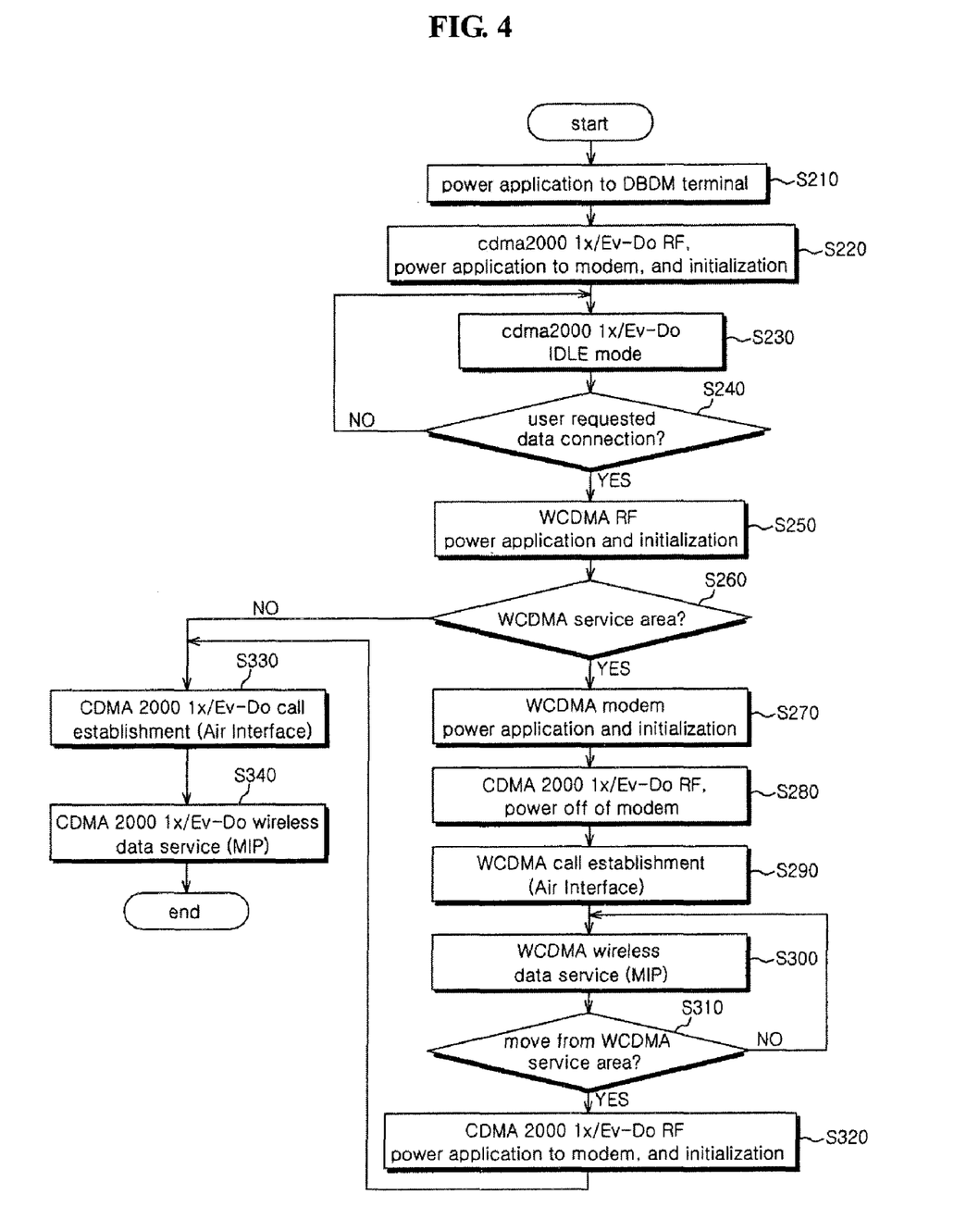
FIG. 4 is a flowchart illustrating a method of controlling a DBDM mobile communication terminal according to another embodiment of the present invention.

FIG. 4 is a flowchart illustrating a method of controlling the DBDM mobile communication terminal according to another embodiment of the present invention, and shows a control method in the case where the mobile communication terminal moves from the asynchronous area into the synchronous area and, thus, the intensity of the signal of the asynchronous mobile communication system is not measured any more. That is, the embodiment of FIG. 4 is a flowchart illustrating a method that only supports handover from the asynchronous mobile communication network to the synchronous mobile communication network, unlike that of FIG. 3.

Referring to FIG. 4, when power is applied to the mobile communication terminal 400 at step S210, the mobile communication terminal 400 applies power to the synchronous wireless device 430 and performs initialization at step S220. Accordingly, the synchronous modem unit 434 is activated, performs location registration with the synchronous mobile communication network 200 through a typical location registration procedure, and enters into an idle mode at step S230.

Thereafter, if a data call, for example, a wireless Internet connection command, is made by a user at step S40, the mobile communication terminal 400 applies power to the asynchronous wireless transmission unit 422 and the asynchronous wireless reception unit 423, which takes charge of the RF of the asynchronous wireless device 420, and performs initialization so as to make a data call connection at step S250.

After step S250, the mobile communication terminal 400 determines whether the current location thereof is contained in the service area of the asynchronous mobile communication network 100 based on the intensity of the signal of the asynchronous mobile communication network 100, which is received through the asynchronous wireless device 420 at step S260.

If it is determined that the location of the mobile communication terminal 400 is contained in the service area of the asynchronous mobile communication network 100 at step S260, power is applied to the asynchronous modem unit 424 of the asynchronous wireless device 420 and initialization is performed at step S270.

Thereafter, the synchronous wireless device 430 is deactivated at step S280, and a WCDMA call (air interface) with the asynchronous mobile communication network 100 is established through the asynchronous wireless device 420 at step S290.

Accordingly, the mobile communication terminal 400 is assigned an MIP address by the HA 320 through the asynchronous mobile communication network 100 and receives data service at step S300.

The mobile communication terminal 400 determines whether the mobile communication terminal 400 has moved from the service area of the asynchronous mobile communication network 100 by continuously measuring signals from the asynchronous mobile communication network 100 during the process of receiving the data service through the asynchronous mobile communication network 100 at step S310.

If it is determined that the mobile communication terminal 400 has moved from the area of the asynchronous mobile communication network 100 based on a predetermined criterion at step S310, the synchronous wireless device 430, which is currently deactivated, is activated at step S320. Thereafter, a CDMA2000 data call with the synchronous mobile communication network 200 is established through the synchronous wireless device 430 at S330.

Accordingly, the mobile communication terminal 400 is assigned an MIP address by the HA 320 through the synchronous mobile communication network 200 and receives data service at step S340.

In the present embodiment, the mobile communication terminal 400 may connect to the synchronous mobile communication system and make a data call in the case where the mobile communication terminal has moved from the asynchronous area to the synchronous area, so that it is not necessary for the asynchronous wireless device 420 of the mobile communication terminal to be always on or to be periodically turned on.

Figure 5A:
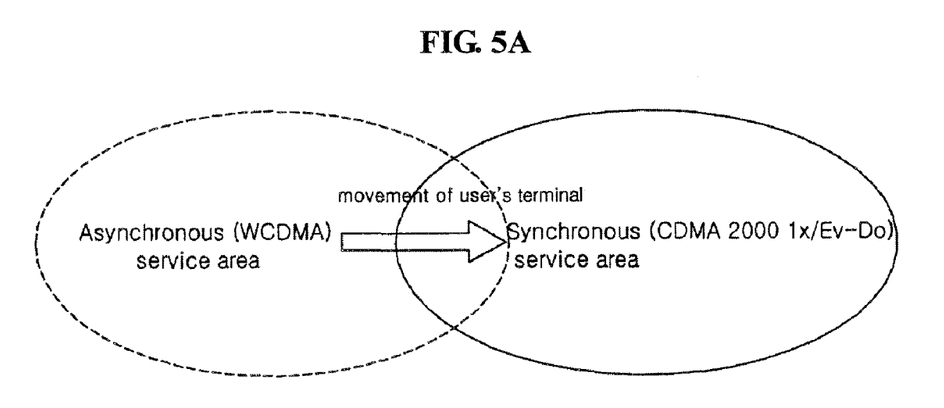
FIGS. 5A and 5B are diagrams conceptually illustrating a handover process when a mobile communication terminal moves from an asynchronous area into a synchronous area.
Figure 5B:
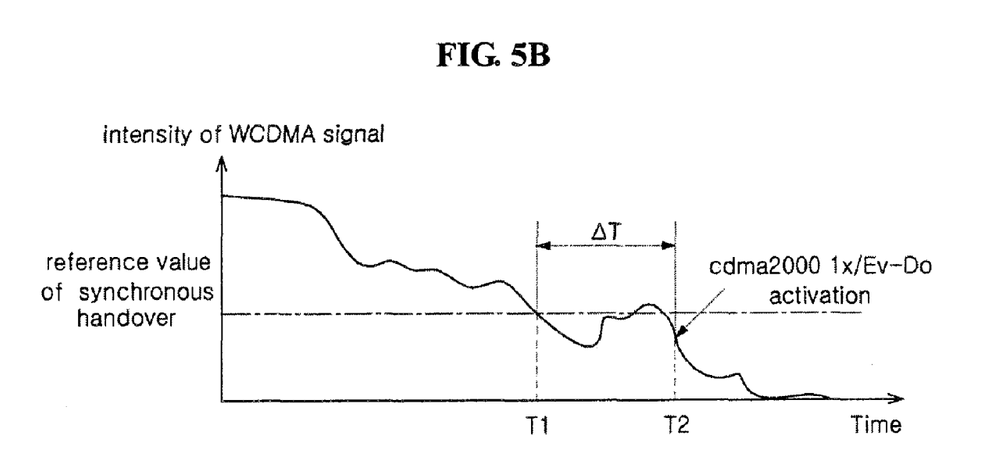

FIGS. 5A and 5B are diagrams conceptually illustrating a handover process when a mobile communication terminal moves from an asynchronous area into a synchronous area.

Referring to FIG. 5, when a timer operates at the time T1 at which the intensity of the signal of the asynchronous mobile communication network 100, such as a WCDMA network, is lower than a reference value for handover to the synchronous network, and the intensity of the signal of the asynchronous mobile communication network 100 at the time T2 at which a reference time ΔT has elapsed is lower than a reference value, the synchronous wireless device 430 is activated and handover is performed.

Although, in the present embodiment, handover is performed when the intensity of the signal of the asynchronous mobile communication network 100 is lower than the reference value for handover even though the reference time ΔT has elapsed the average value of the intensity of the signal of the asynchronous mobile communication network 100 may be calculated for the reference time ΔT, and the time at which the calculated average value is lower than a predetermined value may be set to the time at which handover is to be performed.

Figure 6:
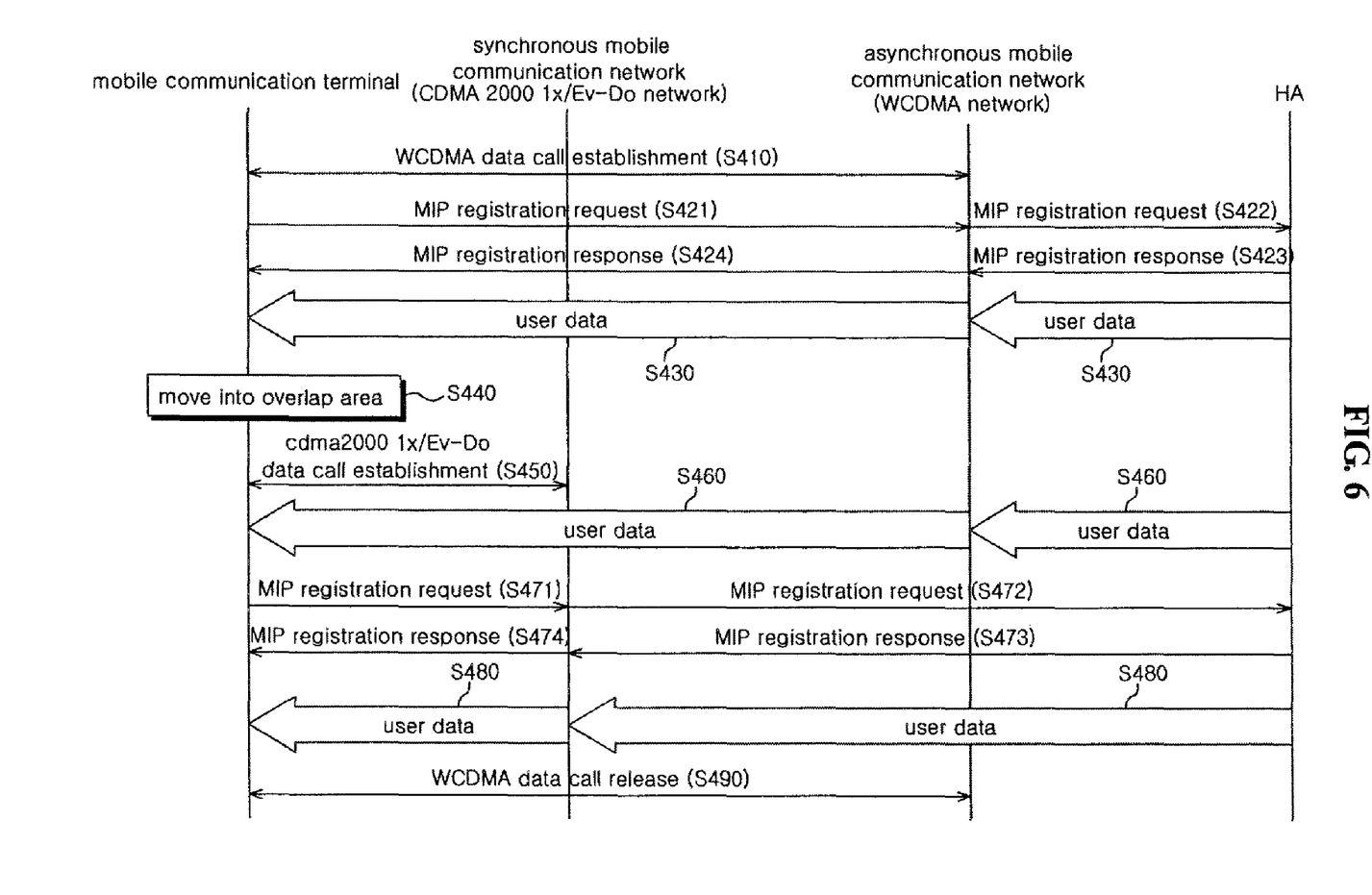
FIG. 6 is a flowchart illustrating a process of handover from an asynchronous mobile communication network to a synchronous mobile communication network according to an embodiment of the present invention.

FIG. 6 is a flowchart illustrating a process of handover from an asynchronous mobile communication network to a synchronous mobile communication network according to an embodiment of the present invention.

The mobile communication terminal 400 establishes a data call with the asynchronous mobile communication network 100, such as a WCDMA network, through the asynchronous wireless device 420 at step S410. After the establishment of the data call, the mobile communication terminal 400 requests the registration of an MIP address to the asynchronous mobile communication network 100 at step S421. Accordingly, the asynchronous mobile communication network 100 requests the registration of the MIP address from the HA 320 connected to the IPDCN 140 at step S422.

In response to the MIP address request at step S422, the HA 320 registers the MIP address for the corresponding mobile communication terminal 400 and transmits a corresponding response message to the asynchronous mobile communication network 100 at step S423. The asynchronous mobile communication network 100 transmits the response of the HA 320 to the mobile communication terminal 400 at step S424. Accordingly, the mobile communication terminal 400 acquires the MIP address in the asynchronous mobile communication network 100 and can receive data requested by a user at step S430.

Meanwhile, when the mobile communication terminal 400, which is currently receiving data service from the asynchronous mobile communication network 100, moves from the area of the asynchronous mobile communication network 100 into the area of the synchronous mobile communication network 200 at step S440, that is, when the mobile communication terminal 400 moves into an area in which the mobile communication networks 100 and 200 overlap, handover from the asynchronous mobile communication network to the synchronous mobile communication network is determined as in the above-described description of FIG. 5.

If it is determined that handover from the asynchronous mobile communication network 100 to the synchronous mobile communication network 200 is to be performed according to the above-described condition, the mobile communication terminal 400 establishes a data call with the synchronous mobile communication network 200 through the synchronous wireless device 430 at step S450.

Although, at step S450, the data call between the mobile communication terminal 400 and the synchronous mobile communication network 200 is established, data requested by a user may be received through the asynchronous mobile communication network 100 at step S460.

The mobile communication terminal 400 requests the registration of the MIP address from the synchronous mobile communication network 200 while the user data is received through the asynchronous mobile communication network 100 at step S471. Accordingly, the synchronous mobile communication network 200 requests the registration of the MIP address from the HA 320 connected to the DCN 240 at step S472.

In response to the MIP address request at step S472, the HA 320 registers the MIP address for the corresponding mobile communication terminal 400 and transmits a corresponding response message to the synchronous mobile communication network 200 at step S473. The synchronous mobile communication network 200 transmits the response of the HA 320 to the mobile communication terminal 400 at step S474.

Accordingly, the mobile communication terminal 400 acquires the MIP address in the synchronous mobile communication network 200 and can receive data, which was previously received through the asynchronous mobile communication network 100, through the synchronous mobile communication network 200 at step S480.

Thereafter, the mobile communication terminal 400 releases the data call with the asynchronous mobile communication network 100 at step S490.

Figure 7A:
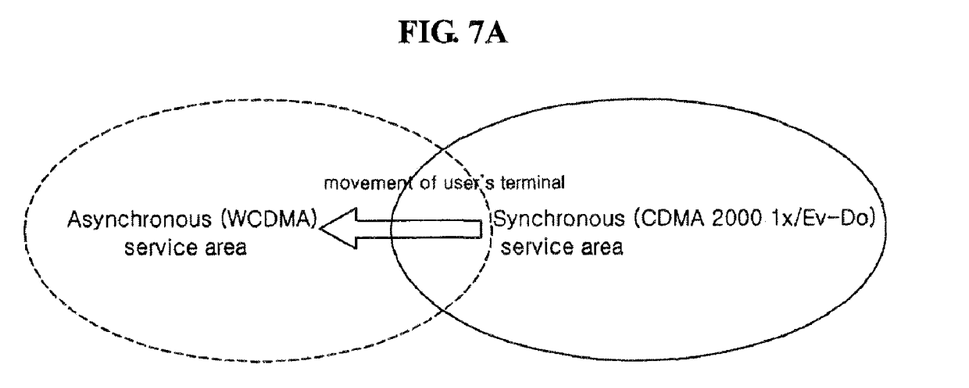
FIGS. 7A and 7B are diagrams conceptually illustrating a handover process when a mobile communication terminal moves from a synchronous area to an asynchronous area.
Figure 7B:
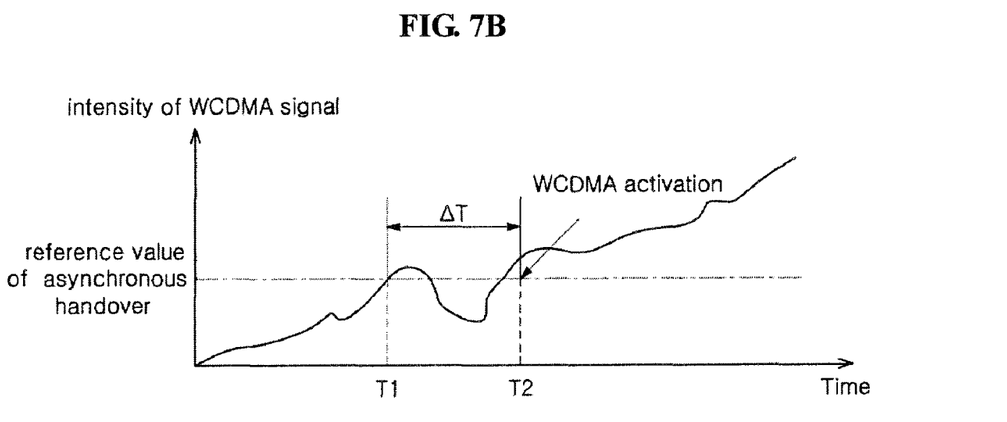

FIGS. 7A and 7B are diagrams conceptually illustrating handover when a mobile communication terminal moves from the synchronous area into the asynchronous area Referring to FIG. 7, when a timer operates at the time T1, at which the intensity of the signal of the asynchronous mobile communication network 100, such as a WCDMA network, becomes greater than a reference value for handover to the asynchronous network, and the intensity of the signal of the asynchronous mobile communication network 100 at the time T2 at which a reference time ΔT has elapsed is greater than a reference value while data call communication is being performed using the synchronous mobile communication network 200, the asynchronous wireless device 420 is activated and handover is performed.

Although, in the present embodiment, handover is performed when the intensity of the signal of the asynchronous mobile communication network 100 is greater than the reference value for handover even though the reference time ΔT has elapsed, the average value of the intensity of the signal of the asynchronous mobile communication network 100 may be calculated for the reference time ΔT, and the time at which the calculated average value is greater than a predetermined value may be set to the time at which handover is to be performed.

Figure 8:
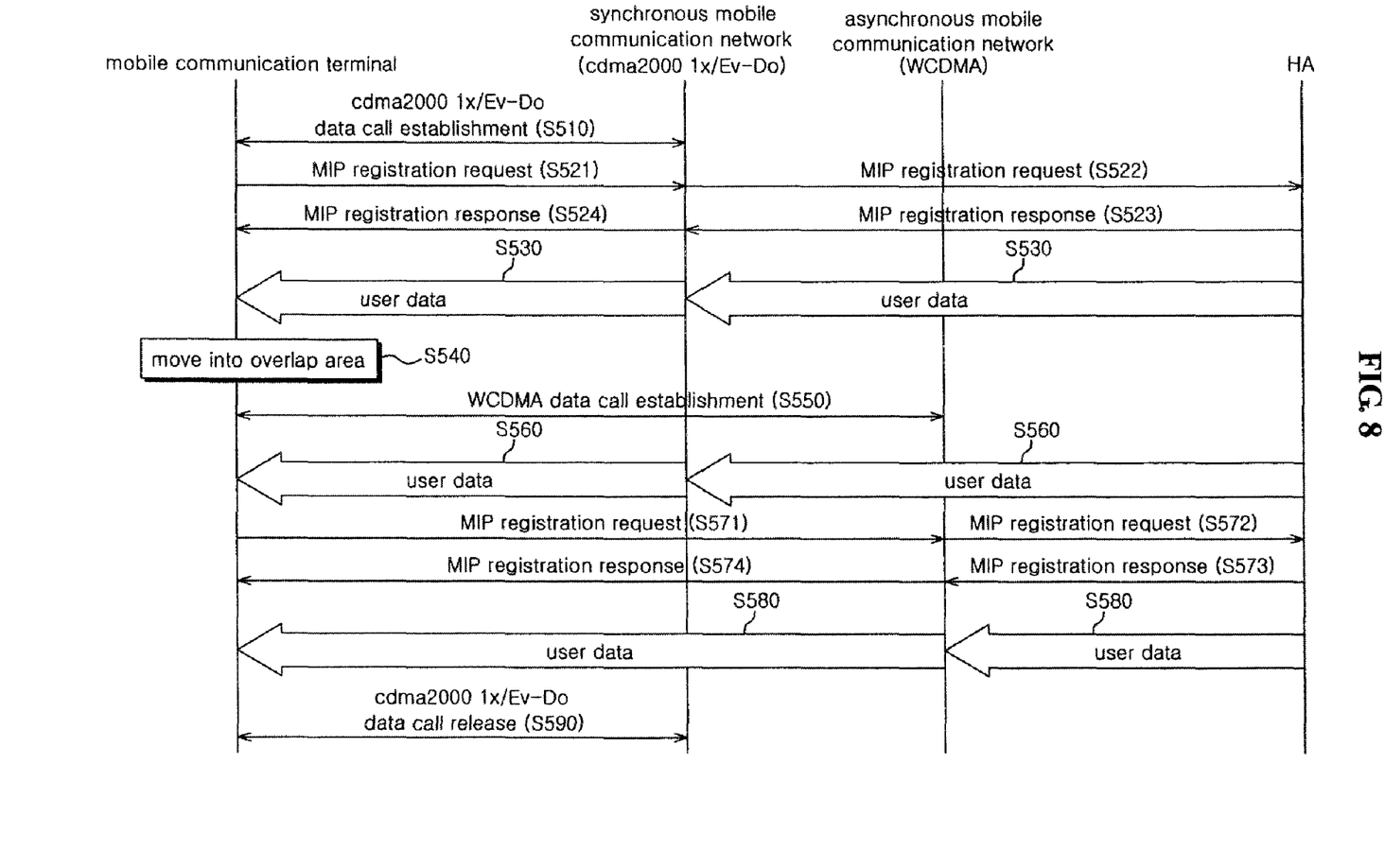
FIG. 8 is a flowchart illustrating a handover process from a synchronous mobile communication network to an asynchronous mobile communication network according to another embodiment of the present invention.

FIG. 8 is a flowchart illustrating a process of handover from the synchronous mobile communication network to the asynchronous mobile communication network according to another embodiment of the present invention.

The mobile communication terminal 400 establishes a data call with the synchronous mobile communication network 200 through the synchronous wireless device 430 at step S510. After the establishment of the data call, the mobile communication terminal 400 requests the registration of an MIP address to the synchronous mobile communication network 200 at step S521. Accordingly, the synchronous mobile communication network 200 requests the registration of the MIP address to the HA 320 connected to the DCN 240 at step S522.

In response to the MIP address request at step S522, the HA 320 registers the MIP address for the corresponding mobile communication terminal 400 and transmits a corresponding response message to the synchronous mobile communication network 200 at step S523. The synchronous mobile communication network 200 transmits the response of the HA 320 to the mobile communication terminal 400 at step S524. Accordingly, the mobile communication terminal 400 acquires the MIP address in the synchronous mobile communication network 200 and can receive data requested by a user at step S530.

Meanwhile, when the mobile communication terminal 400, which is currently receiving data service from the synchronous mobile communication network 200, moves from the area of the synchronous mobile communication network 200 into the area of the asynchronous mobile communication network 100 at step S540, that is, when the mobile communication terminal 400 moves into an area in which the mobile communication networks 100 and 200 overlap, handover from the synchronous mobile communication network 200 to the asynchronous mobile communication network 100 is determined as in the above-described description of FIG. 7.

If it is determined that handover from the synchronous mobile communication network 200 to the asynchronous mobile communication network 100 is to be performed according to the above-described condition, the mobile communication terminal 400 establishes a data call with the asynchronous mobile communication network 100 through the asynchronous wireless device 420 at step S550.

Although, at step S550, the data call between the mobile communication terminal 400 and the asynchronous mobile communication network 100 is established, data requested by a user may be received through the synchronous mobile communication network 200 at step S560.

The mobile communication terminal 400 requests registration of the MIP address to the asynchronous mobile communication network 100 while the user's data is received through the synchronous mobile communication network 200 at step S571. Accordingly, the asynchronous mobile communication network 100 requests the registration of the MIP address to the HA 320 connected to the IPDCN 140 at step S572.

In response to the MIP address request at step S572, the HA 320 registers the MIP address for the corresponding mobile communication terminal 400 and transmits a corresponding response message to the asynchronous mobile communication network 100 at step S573. The asynchronous mobile communication network 100 transmits the response of the HA 320 to the mobile communication terminal 400 at step S574. Accordingly, the mobile communication terminal 400 acquires the MIP address in the asynchronous mobile communication network 100 and can receive data, which has been received through the synchronous mobile communication network 200, through the asynchronous mobile communication network 100 at step S580.

Thereafter, the mobile communication terminal 400 releases the data call with the synchronous mobile communication network 200 at step S590.

INDUSTRIAL APPLICABILITY

As described above, in accordance with the present invention, the loss of data is prevented using a mobile communication terminal that supports a DBDM at the time of handover of the mobile communication terminal when receiving data call service, so that uninterrupted handover can be performed without the disconnection of a data call.

The invention claimed is:

1. A method of controlling a mobile communication terminal that supports a Dual Band Dual Mode (DBDM), the mobile communication terminal having an antenna for transmitting and receiving radio waves to and from a synchronous mobile communication network and an asynchronous mobile communication network, an asynchronous wireless device for performing asynchronous communication with the asynchronous mobile communication network through the antenna, and a synchronous wireless device for performing synchronous communication with the synchronous mobile communication network through the antenna, and the mobile communication terminal being capable of performing wireless communication with the asynchronous mobile communication network and the synchronous mobile communication network, the method comprising:

a first step of activating wireless transmission and reception units of the asynchronous wireless device when a data call connection command is inputted;

a second step of determining whether the mobile communication terminal is located in a service area of the asynchronous mobile communication network through the wireless transmission and reception units of the activated asynchronous wireless device, before activating an asynchronous modem of the asynchronous wireless device;

a third step of activating the asynchronous modem of the asynchronous wireless device if the mobile communication terminal is located in the service area of the asynchronous mobile communication network at the second step;

a fourth step of acquiring a Mobile Internet Protocol (MIP address) in the asynchronous mobile communication network through the asynchronous wireless device and performing data service; and a fifth step of performing a handover to the synchronous mobile communication network based on an intensity of a signal of the asynchronous mobile communication network while the fourth step is performed.

2. The method according to claim 1, further comprising, before the first step, upon first application of power to the mobile communication terminal, a step of controlling the mobile communication terminal to perform the synchronous communication with the synchronous mobile communication network.

3. The method according to claim 2, wherein the step of controlling the mobile communication terminal comprises:
activating the synchronous wireless device; and
performing location registration with the synchronous mobile communication network.

4. The method according to claim 3, wherein after the third step, the synchronous wireless device is deactivated.

5. The method according to claim 1, further comprising a step of requesting the MIP address to the synchronous mobile communication network and performing data call service if the mobile communication terminal is not located in the service area of the asynchronous mobile communication network at the second step.

6. The method according to claim 1, wherein the fifth step comprises the steps of:
determining whether the intensity of the signal of the asynchronous mobile communication network is lower than a reference value for the handover;
waiting until a predetermined time elapses if it is determined that the intensity of the signal is lower than the reference value; and
activating the synchronous wireless device and performing the handover to the synchronous mobile communication network if the intensity of the signal of the asynchronous mobile communication network is lower than the reference value after the reference time has elapsed.

7. The method according to claim 6, wherein the fifth step further comprises, after the step of performing the handover to the synchronous mobile communication network, a step of releasing a connection between the mobile communication terminal and the asynchronous mobile communication network.

8. The method according to claim 1, wherein the fifth step comprises the steps of:
determining whether the intensity of the signal of the asynchronous mobile communication network is lower than a reference value for the handover;
calculating an average value of the intensity of the signal until a predetermined time elapses if it is determined that the intensity of the signal is lower than the reference value; and
activating the synchronous wireless device and performing the handover to the synchronous mobile communication network when the average value of the intensity of the signal of the asynchronous mobile communication network is lower than a predetermined value after the predetermined time has elapsed.

9. The method according to claim 8, wherein the fifth step further comprises, after the step of performing the handover to the synchronous mobile communication network, a step of releasing a connection between the mobile communication terminal and the asynchronous mobile communication network.

10. The method according to claim 1, further comprising, after the fifth step:
a sixth step of measuring the signal of the asynchronous mobile communication network through the wireless transmission and reception units of the asynchronous wireless device and determining whether the mobile communication terminal has entered the asynchronous service area of the asynchronous mobile communication network; and
a seventh step of repeatedly performing a process ranging from the third step to the seventh step if it is determined that the mobile communication terminal has entered the asynchronous service area at the sixth step.

* * * * *